United States Patent
Enz et al.

(10) Patent No.: US 9,434,310 B2
(45) Date of Patent: Sep. 6, 2016

(54) ATTACHMENT SYSTEM FOR AN EXTERIOR COVER OF A VEHICLE MIRROR ASSEMBLY

(71) Applicant: Lang-Mekra North America, LLC, Ridgeway, SC (US)

(72) Inventors: Andreas Enz, Columbia, SC (US); Emmanuel Courbon, Columbia, SC (US); Mathieu Ihoste-Clos, Columbia, SC (US)

(73) Assignee: LANG-MEKRA NORTH AMERICA, LLC, Ridgeway, SC (US)

( * ) Notice: Subject to any disclaimer, the term of this patent is extended or adjusted under 35 U.S.C. 154(b) by 321 days.

(21) Appl. No.: 14/188,049

(22) Filed: Feb. 24, 2014

(65) Prior Publication Data

US 2014/0241792 A1    Aug. 28, 2014

Related U.S. Application Data

(60) Provisional application No. 61/769,838, filed on Feb. 27, 2013.

(51) Int. Cl.

| | |
|---|---|
| *B25G 3/18* | (2006.01) |
| *F16B 21/00* | (2006.01) |
| *F16D 1/00* | (2006.01) |
| *B60R 1/06* | (2006.01) |
| *B60R 1/04* | (2006.01) |
| *B60R 1/02* | (2006.01) |
| *F16B 2/24* | (2006.01) |

(52) U.S. Cl.
CPC .. *B60R 1/06* (2013.01); *B60R 1/02* (2013.01); *B60R 1/04* (2013.01); *F16B 2/241* (2013.01); *Y10T 24/44009* (2015.01); *Y10T 24/44017* (2015.01); *Y10T 24/44197* (2015.01); *Y10T 24/44205* (2015.01); *Y10T 403/602* (2015.01)

(58) Field of Classification Search
CPC ............. B60R 1/06; B60R 1/02; B60R 1/04; Y10T 24/44009; Y10T 24/44017; Y10T 24/44197; Y10T 24/44205
USPC ................ 403/327, 326; 359/871, 838, 883; 248/478, 466, 483; 24/456, 289, 485, 24/570, 571, 572.1, 573.09, 581.1, 581.11, 24/591.1, 592.1, 598.4, 594.1, 494.11, 24/602, 698.1
See application file for complete search history.

(56) References Cited

U.S. PATENT DOCUMENTS

| | | | |
|---|---|---|---|
| 7,614,755 B2 | 11/2009 | Branham | |
| 8,201,800 B2* | 6/2012 | Filipiak | ..................... B60R 1/04 248/483 |
| 2002/0048101 A1* | 4/2002 | Miyabukuro | ........... B60R 1/072 359/871 |
| 2010/0328795 A1* | 12/2010 | Ferman | ..................... B60R 1/06 359/871 |

* cited by examiner

*Primary Examiner* — Chi Q Nguyen
(74) *Attorney, Agent, or Firm* — McNair Law Firm, P.A.; Seann P. Lahey

(57) ABSTRACT

A carrier plate including mounting tabs. A cover including attachment sockets releasably engaging the mounting tabs. A spring clip carried in each of the attachment sockets releasably engaging the mounting tabs. A bezel extending around the carrier plate including a bezel lip extending along select portions of the bezel, and a cover lip receiving slot disposed along select portions of the bezel not including the bezel lip. A cover lip included on the cover extending along select portions of a perimeter edge of the cover, and a bezel lip receiving slot extending along select portions of the perimeter edge not including the cover lip. The cover lip is received into the cover lip receiving slot and the bezel lip is received into the bezel lip receiving slot for mounting the cover to the carrier plate.

20 Claims, 17 Drawing Sheets

ATTACHMENT SYSTEM FOR AN EXTERIOR COVER OF A VEHICLE MIRROR ASSEMBLY

BACKGROUND OF THE INVENTION

1) Field of the Invention

The present invention relates to exterior vehicle mirror assemblies, and more particularly, to a system for attaching an exterior cover to a vehicle mirror assembly.

2) Description of Related Art

A substantial problem with external vehicle rear view mirrors, particularly in the case of commercial vehicles, is the occurrence of vibration. First, vibration can negatively affect the use of the mirror, and second, vibration of the mirror can lead to damage due to fatigue for nearly every component in the mirror assembly. The housing components are particularly susceptible to wind and road vibrations, leading to excessive wear and tear between housing components.

It is common for a typical exterior rear view mirror assembly to have a carrier plate which support and protects various interior components. The carrier plate can include an exterior bezel component that attaches to a housing cover to provide a finished appearance. The housing cover and bezel typically snap together through various forms of clips and hooks that are usually molded as part of the housing or bezel. The clips and hooks are typically carried on one or the other of the bezel or cover and engage various recesses or openings on the other of the cover or bezel to secure the cover on the bezel. The problem with the arrangements typically used is that the vibrations cause the clips and hooks to wear and loosen the connection between the cover and bezel. As the clips continue to wear, they eventually disengage and the bezel or cover can fall off or be easily pulled off of the housing. Further, many of the clip designs simply do not provide sufficient strength and connection to prevent the bezel from being easily removed.

Other connecting arrangements typically involve the use of metal screws and the like that mount the cover and bezel to the carrier plate. While this provides a secure connection and resists vibration, this increases manufacturing complexity and makes removing the cover for repairs more difficult or even impossible depending on the specifics of the design.

Accordingly, it is an object of the present invention to provide an external rear view mirror assembly for vehicles, especially for commercial vehicles, which includes an improved interconnection between the cover, bezel and carrier plate that is less subject to wear and tear caused by vibration.

It is a further object of the present invention to provide an attachment arrangement for mounting the cover to the carrier plate and bezel that reduces assembly complexity and is easily removable for repairs.

SUMMARY OF THE INVENTION

The above objectives are accomplished according to the present invention by providing an attachment system for an exterior cover of a vehicle mirror assembly comprising a carrier plate for supporting mirror assembly components; a plurality of mounting tabs projecting outward from a first side of the carrier plate; an exterior cover mounted to the carrier plate to generally enclose the first side of the carrier plate; a complementary arrangement of attachment sockets carried by the cover receiving the mounting tabs; and, a spring clip carried in each of the attachment sockets engaging the mounting tabs in a releasably connected engagement; whereby the cover is securely and releasably mounted to the carrier plate.

In a further advantageous embodiment, a release tab is disposed generally adjacent at least one of the attachment sockets extending through a complementary release tab opening disposed in the carrier plate generally adjacent one of the mounting tabs, whereby directing the release tab back through the release tab opening causes the attachment socket to disengage from the mounting tab for removing the cover from the carrier plate.

In a further advantageous embodiment, each spring clip includes a first flexible retaining arm carried on a first side in each of the attachment sockets, and a second flexible retaining arm carried on a second side in each of the attachment sockets disposed opposite the first side, wherein the first and second flexible retaining arms engage opposing sides of the mounting tabs for holding the mounting tabs in the attachment sockets.

In a further advantageous embodiment, the mounting tabs include a head portion having angled engaging surfaces disposed on opposite sides, and the first and second flexible retaining arms having a complementary retaining surface aligning flush against each of the angled engaging surfaces of the mounting tabs in a friction fit arrangement releasably holding the mounting tabs in the attachment sockets.

In a further advantageous embodiment, the engagement between the angled engaging surfaces of the mounting tabs and the retaining surfaces of the first and second flexible retaining arms direct the first and second flexible retaining arms to extend laterally when the mounting tabs are withdrawn from the attachment sockets.

In a further advantageous embodiment, a flange is disposed around the attachment socket defining a clip recess, wherein the spring clip is seated in the clip recess to resist movement of the spring clip in the attachment socket.

In a further advantageous embodiment, the carrier plate includes a bezel extending around a perimeter of the carrier plate. Preferably, the bezel includes a bezel lip extending along select portions of the bezel, and a cover lip receiving slot extending along select portions of the bezel not including the bezel lip. The cover includes a cover lip extending along select portions of a perimeter edge of the cover, and a bezel lip receiving slot extending select portions of the perimeter edge not including the cover lip. The cover lip is received into the cover lip receiving slot of the bezel and the bezel lip is received into the bezel lip receiving slot of the cover so that an exterior surface of the bezel is aligned generally flush with an exterior surface of the cover when mounted to the carrier plate.

In a further advantageous embodiment, a bezel lip is disposed along a first bezel corner portion and a second bezel corner portion. A cover lip receiving slot is disposed along a first bezel vertical edge and a second bezel vertical edge. A cover lip is disposed along a first cover vertical edge and a second cover vertical edge. A bezel lip receiving slot is disposed along a first cover corner portion and a second cover corner portion.

In a further advantageous embodiment, the cover lip receiving slot extends along a top bezel edge, and the cover lip extends along a top cover edge, wherein the cover lip of the top cover edge is received into the cover lip receiving slot on the top bezel edge for interconnecting the cover to the bezel.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. In particular, while the invention is described herein with reference to specific embodiments, it will be appreciated that the description is illustrative of the invention and is not constructed as limiting of the invention. Various modifications and applications may occur to those who are skilled in the art, without departing from the spirit and the scope of the invention. Likewise, other objects, features, benefits and advantages of the present invention will be apparent from this summary and certain embodiments described below.

DETAILED DESCRIPTION OF A PREFERRED EMBODIMENT

Figure 1:
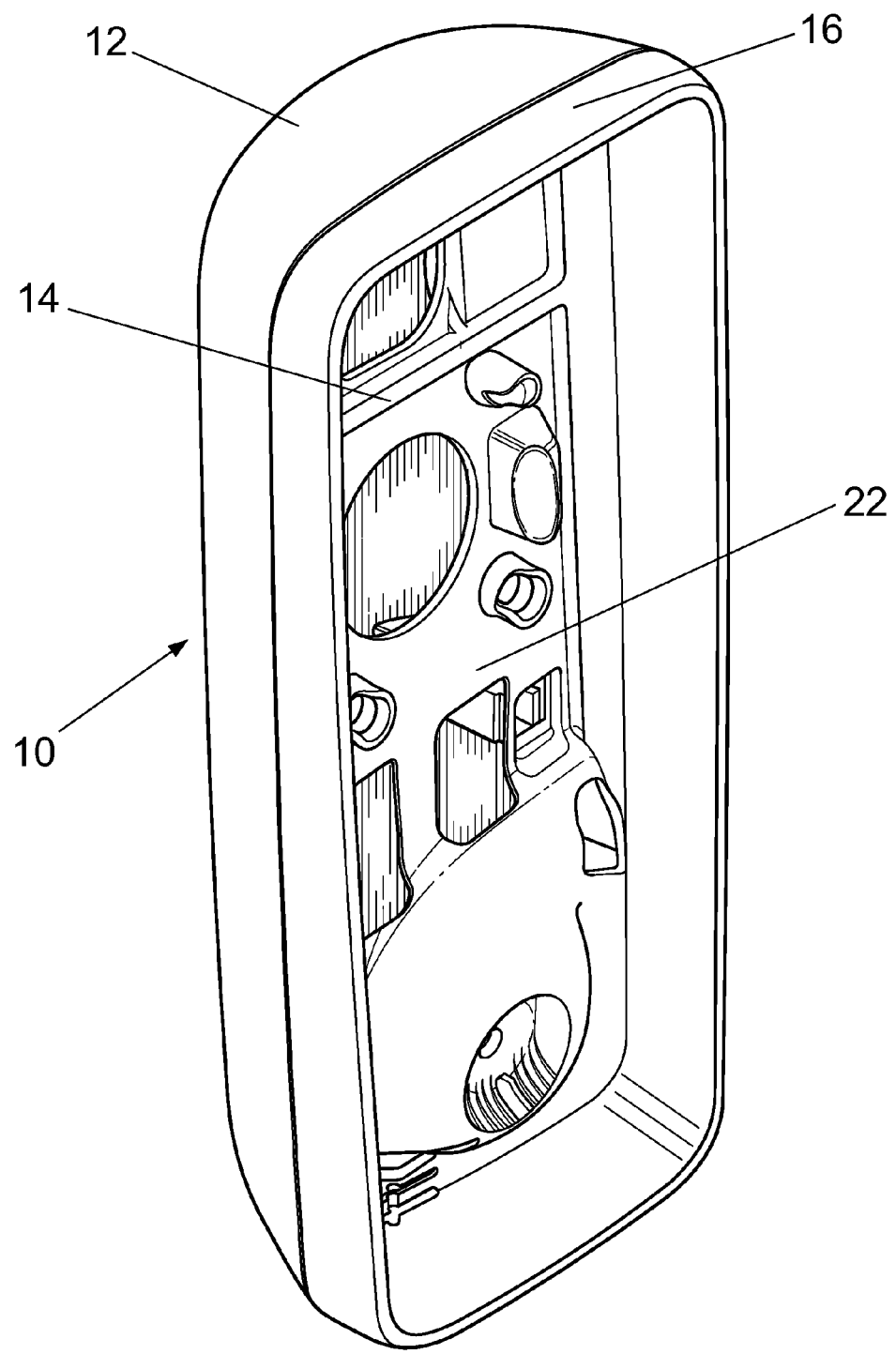
FIG. 1 shows a perspective view of a cover mounted to a carrier plate according to the present invention.
Figure 2:
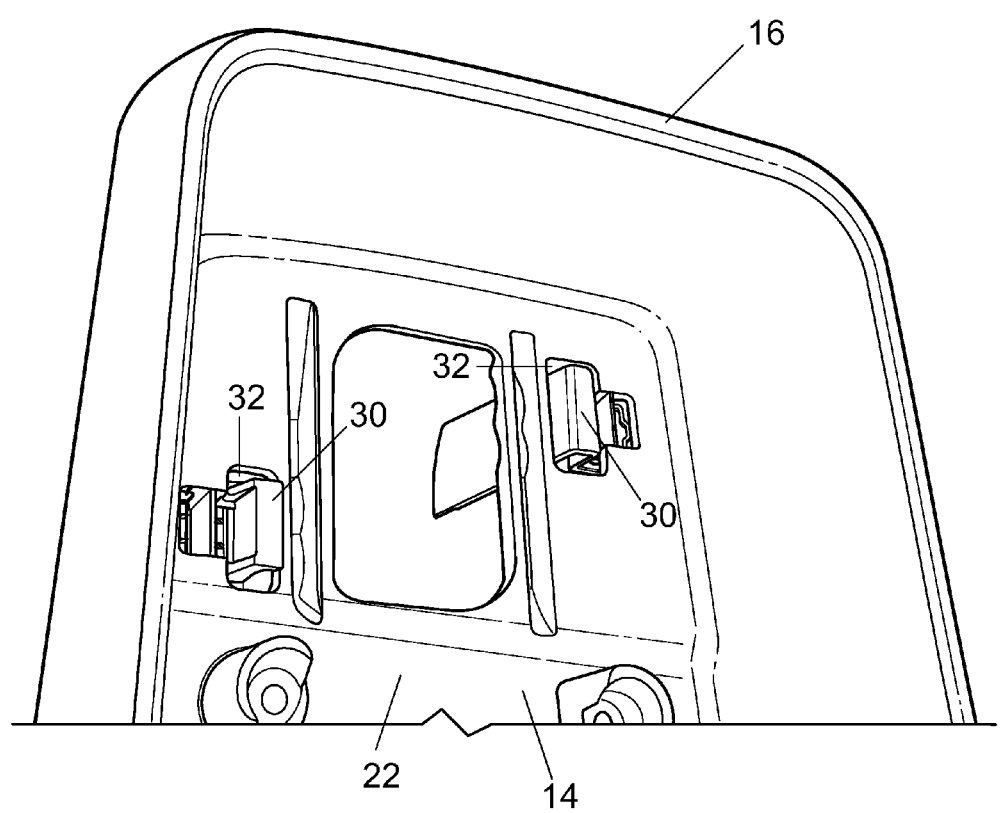
FIG. 2 shows a partial perspective view of release tabs projecting through the carrier plate according to the present invention.

With reference to the drawings, the invention will now be described in more detail. Referring to FIG. 1, an exterior vehicle mirror assembly, designated generally as 10, is shown having an exterior cover 12 carried by a carrier plate 14 and connected to a bezel 16.

Figure 3:
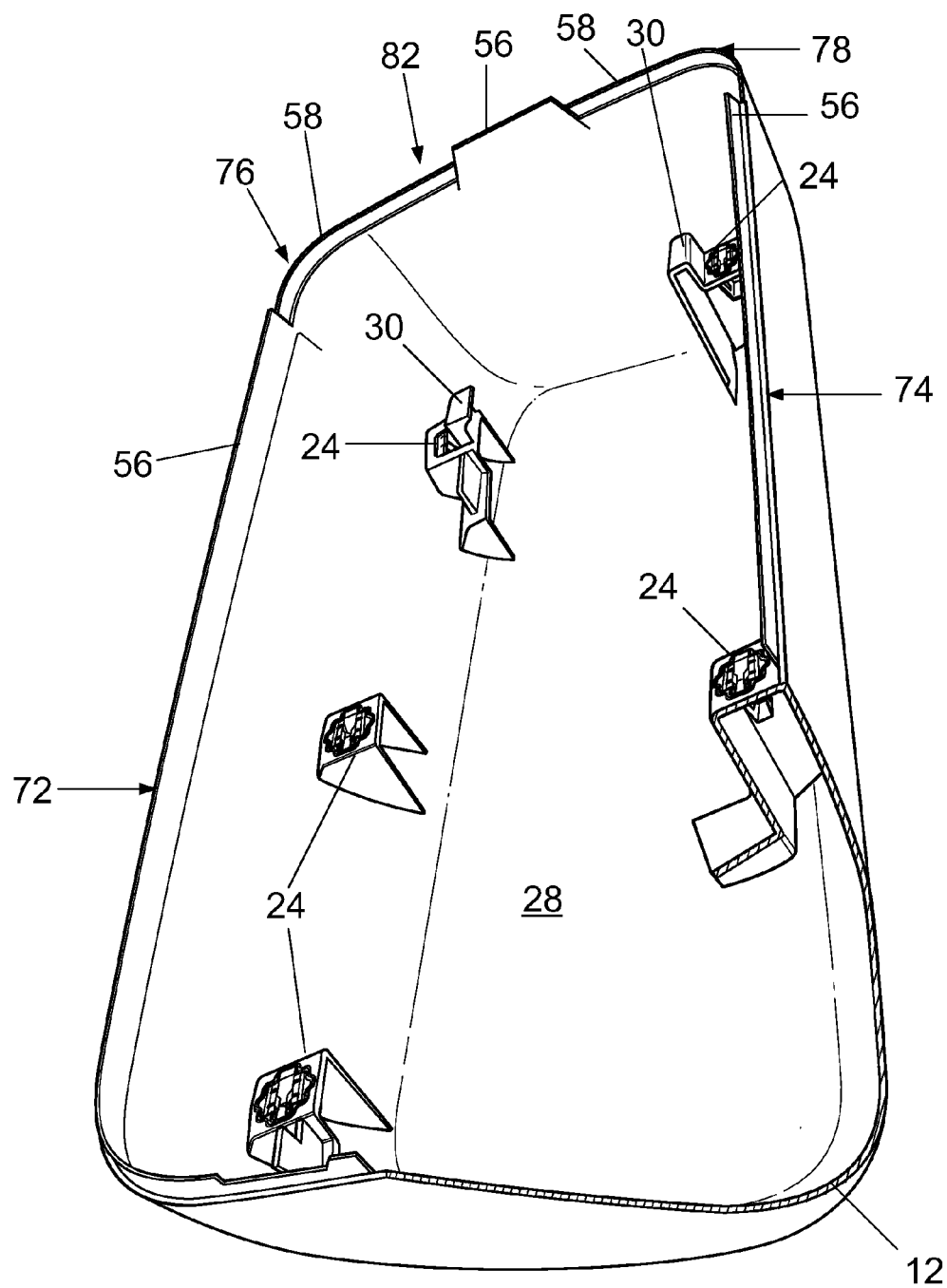
FIG. 3 shows a perspective view of an interior side of the cover according to the present invention.
Figure 6:
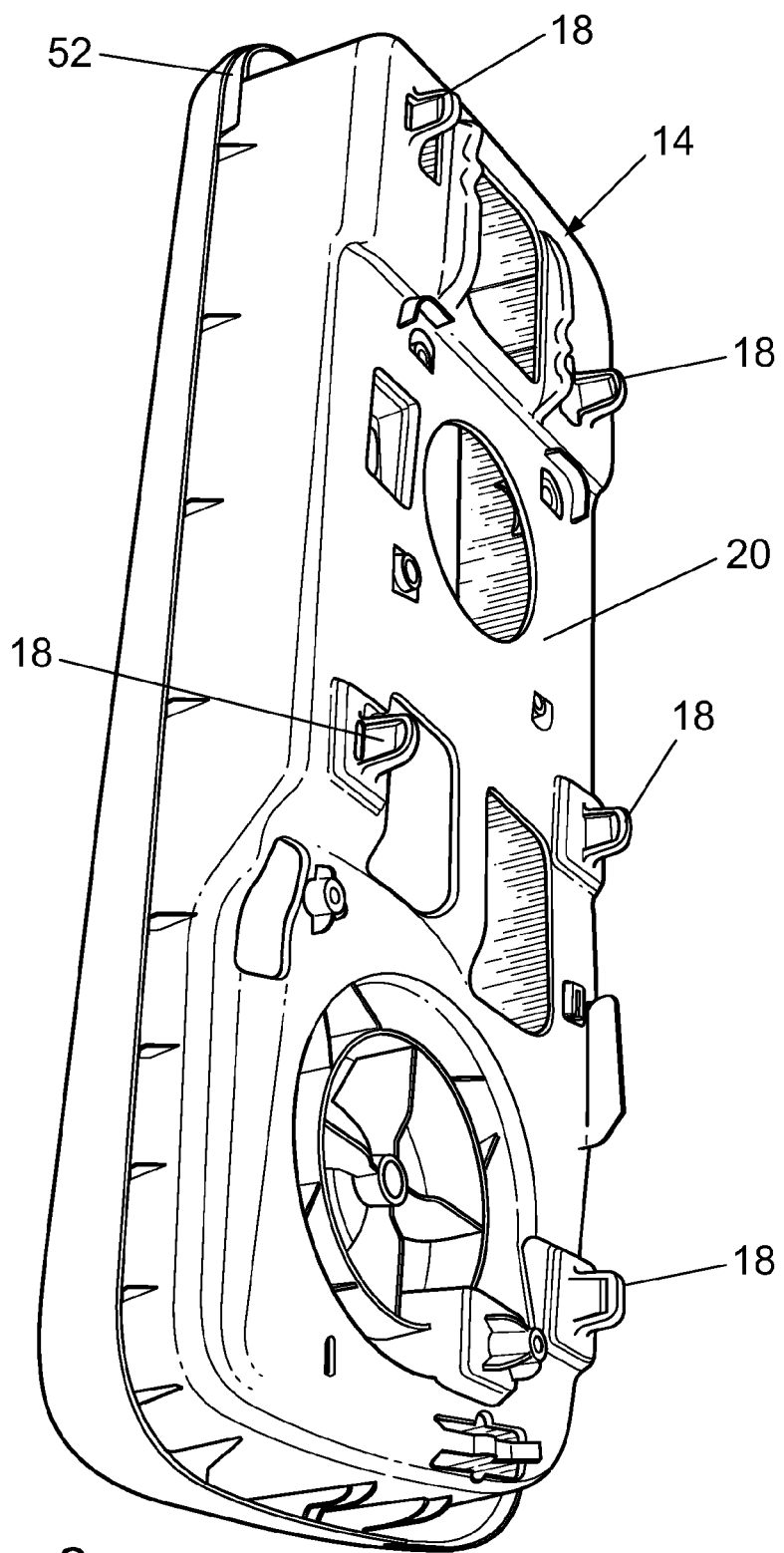
FIG. 6 shows a perspective view of a rear side of the carrier plate according to the present invention.

With further reference to FIG. 6, carrier plate 14 is provided for supporting various mirror assembly components, for example, motors, mirror glass, and in particular, cover 12. In part, the attachment system includes a plurality of mounting tabs 18 projecting outward from a first side 20 of carrier plate 14. Referring to FIG. 3, a complementary arrangement of attachment sockets, designated generally as 24, are carried by cover 12 for receiving mounting tabs 18. Cover 12 is mounted to carrier plate 14 on mounting tabs 18 to generally enclose first side 20 of carrier plate 14 and provide a finished appearance in combination with bezel 16, which raps around to a second side 22 (FIG. 1) of carrier plate 14.

Figure 4:
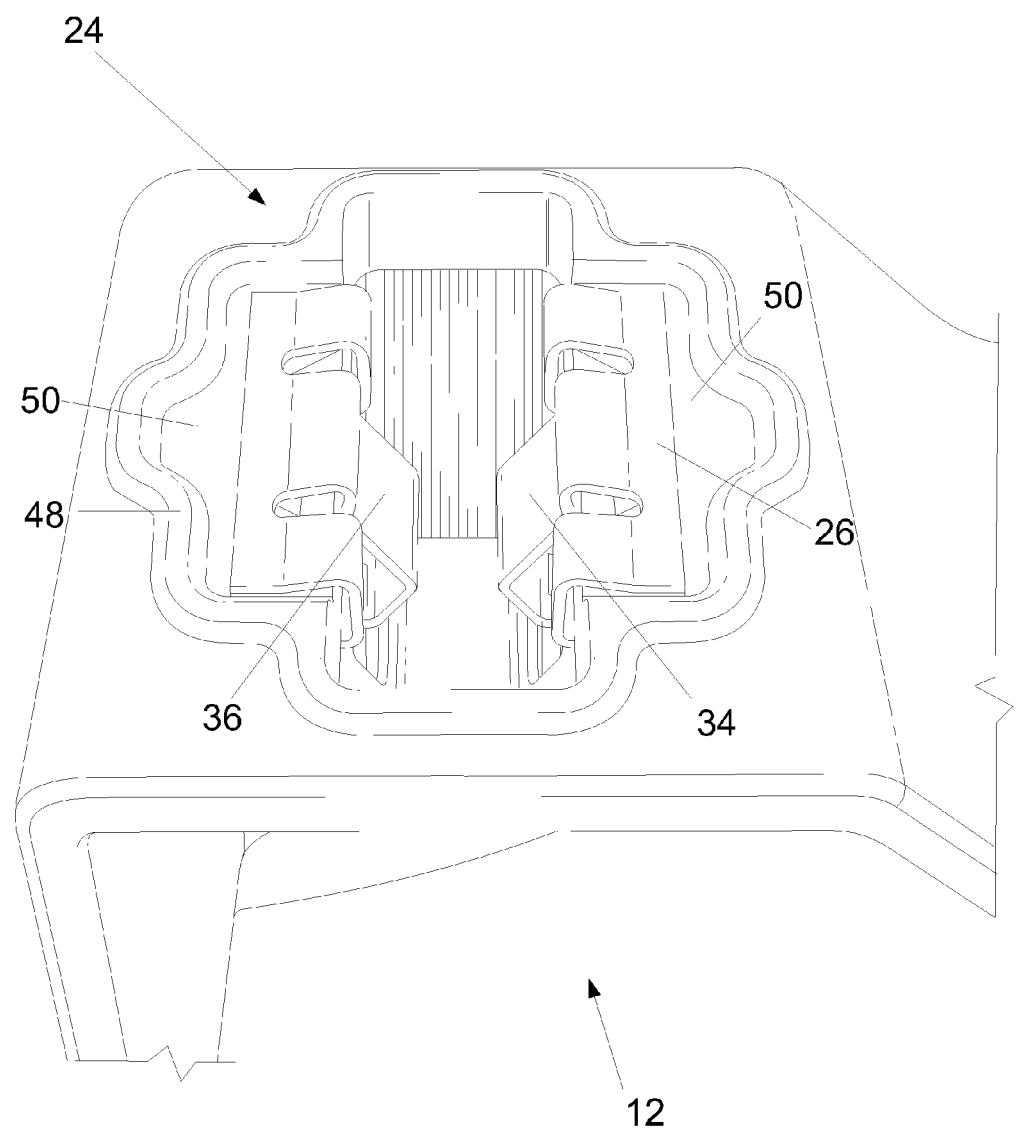
FIG. 4 shows an enlarged perspective view of an attachment socket and spring clip according to the present invention.
Figure 5:
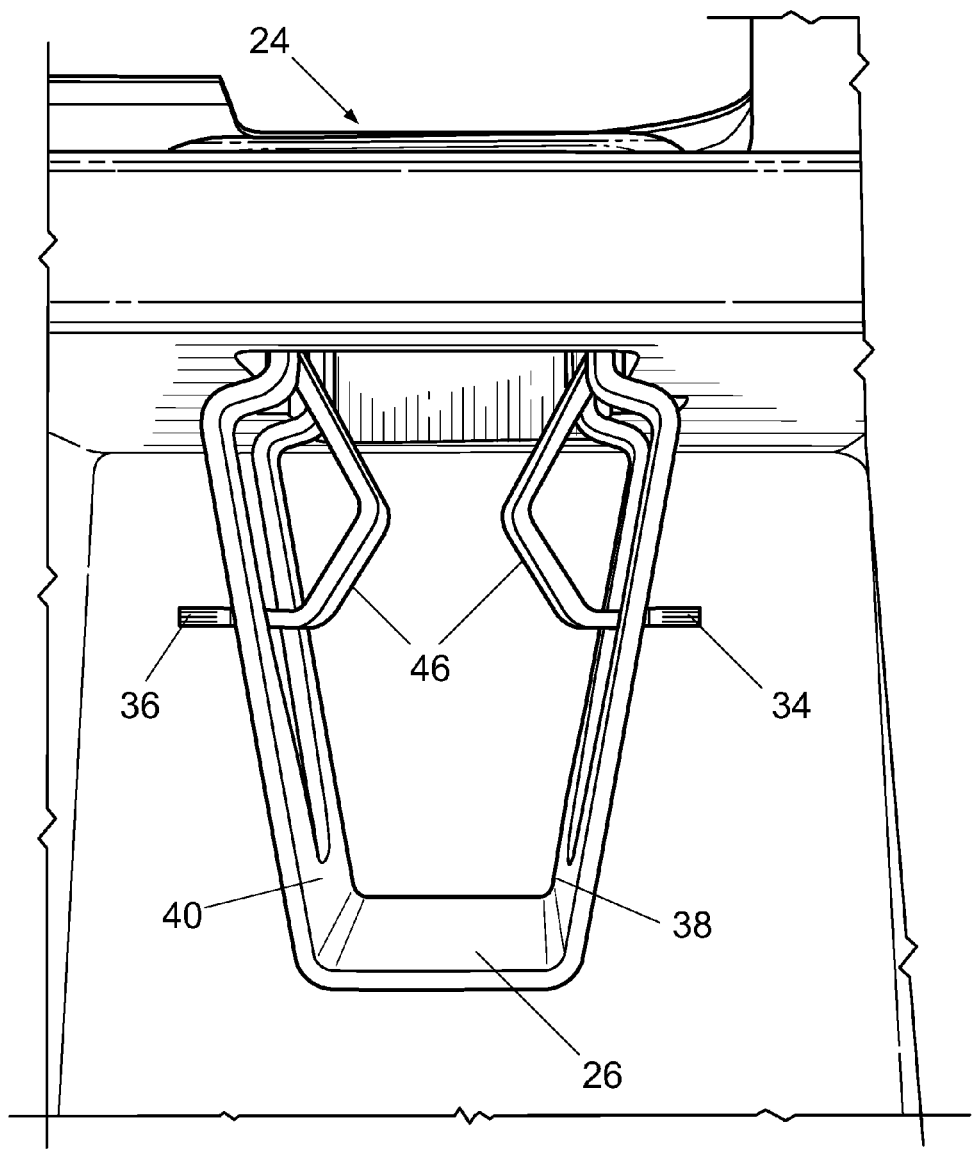
FIG. 5 shows an enlarged side view of the attachment socket and spring clip according to the present invention.

Referring to FIGS. 4 and 5, a spring clip 26 is carried in each of attachment sockets 24. Spring clips 26 engage mounting tabs 18 to securely hold mounting tabs 18 in place within attachment sockets 24 in friction fit arrangement, but also allows for a releasably connected engagement in which mounting tabs 18 can simply be withdrawn to disconnect cover 12 from carrier plate 14.

Referring to FIGS. 2-3 and FIGS. 13-14, a release tab 30 is carried on an interior side 28 of cover 12. Release tab 30 is provided to extend through a release tab opening 32 in carrier plate 14 and project outward from second side 22. By directing release tab 30 back through release tab opening 32, for example by pressing with a finger, attachment sockets 24 can be disengaged from mounting tabs 18 for removing cover 12 from carrier plate 14. In the illustrated embodiment, release tab 30 is disposed generally adjacent at least one of attachment sockets 24 and extends through a complementary release tab opening 32 disposed in carrier plate 14 generally adjacent one of mounting tabs 18. This arrangement is provided for illustrative purposes only of a preferred embodiment and is not limiting of other possible arrangements and locations for the release tabs 30 and release tab openings 32.

Referring to FIGS. 4-5, 13-15, each spring clip 26 includes at least one flexible retaining arm 34 for engaging a side surface of a respective mounting tab 18. In the illustrated embodiment, spring clip 26 includes a first flexible retaining arm 34 carried on a first side 38 in each of attachment sockets 24, and a second flexible retaining arm 36 carried on a second side 40 in each of attachment sockets 24 disposed opposite first side 38. When engaged, first and second flexible retaining arms 34 and 36 engage opposing sides of mounting tabs 18 for holding mounting tabs 18 in attachment sockets 24.

Figure 12:
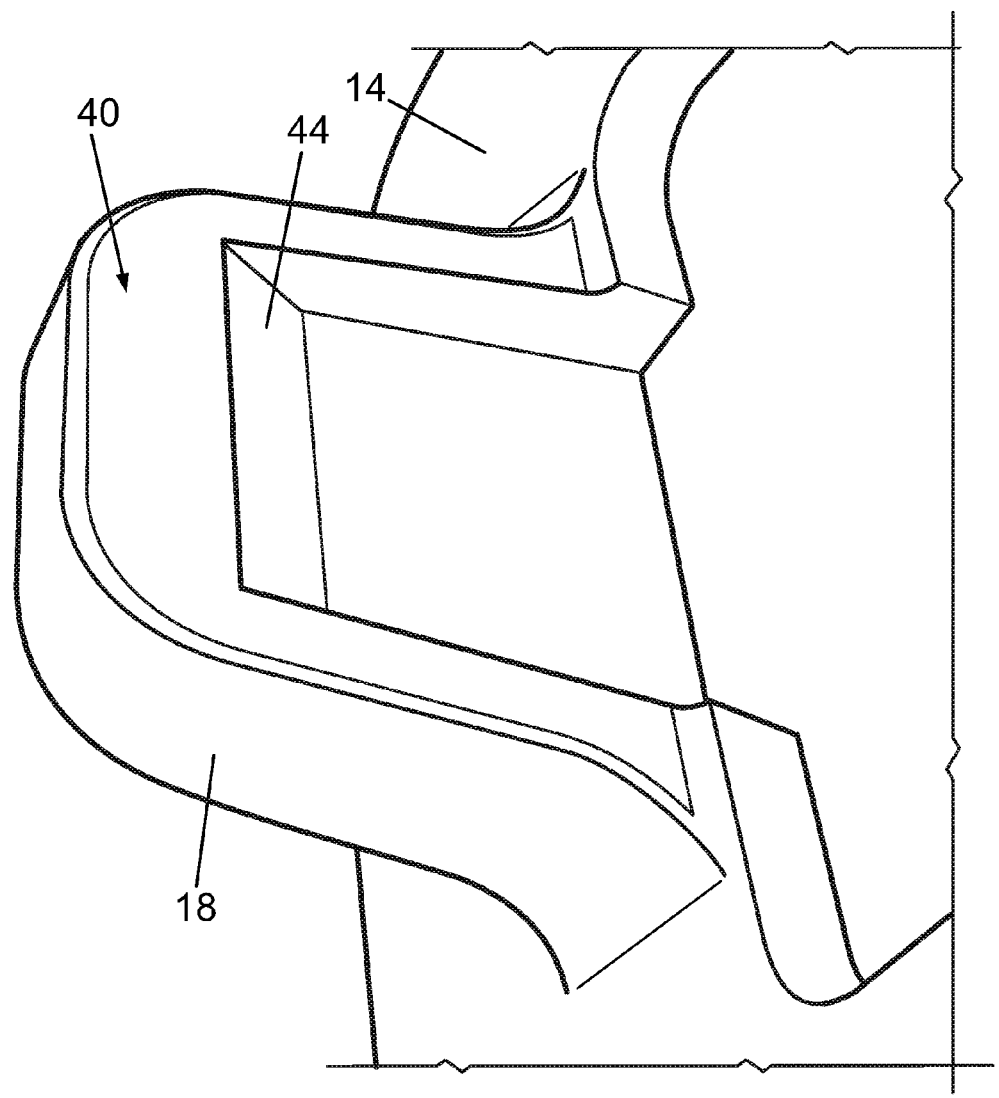
FIG. 12 shows an enlarged perspective view of a mounting tab according to the present invention.
Figure 13:
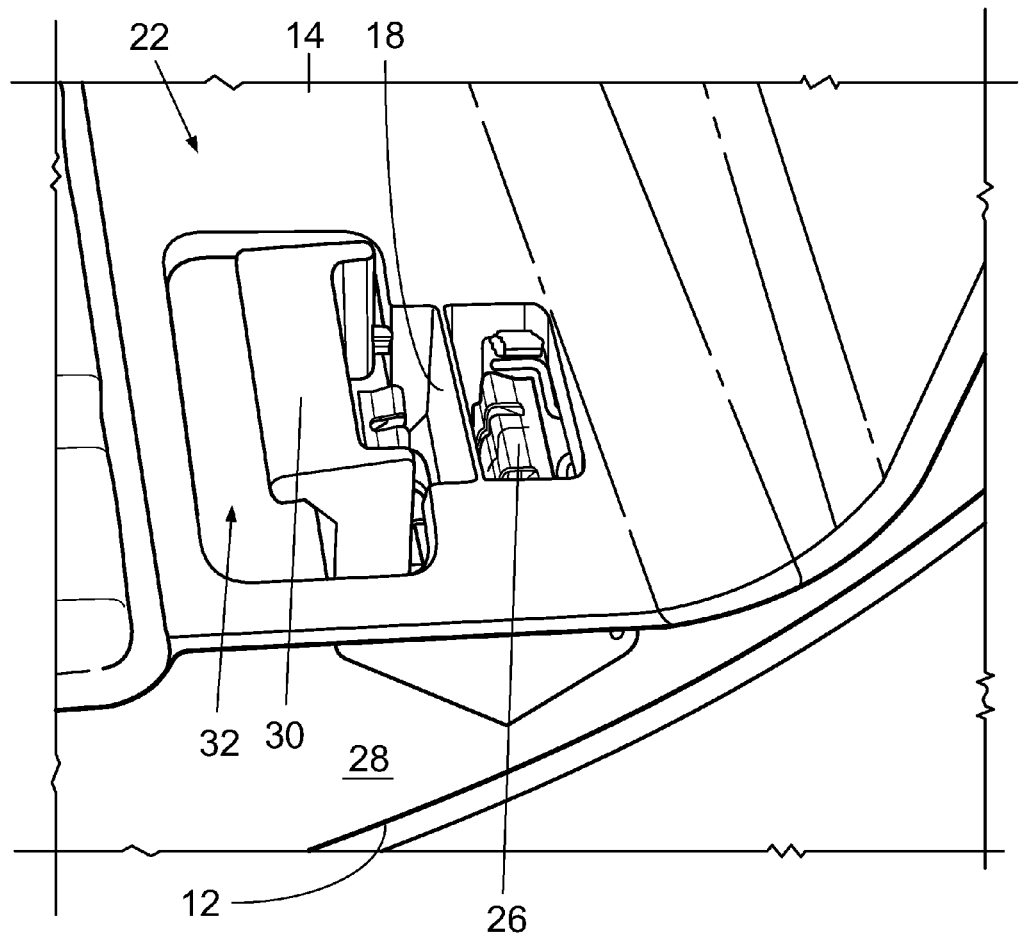
FIG. 13 shows an enlarged cut-away view of a mounting tab received into an attachment socket and a release tab extending through a release tab opening in the carrier plate according to the present invention.
Figure 14:
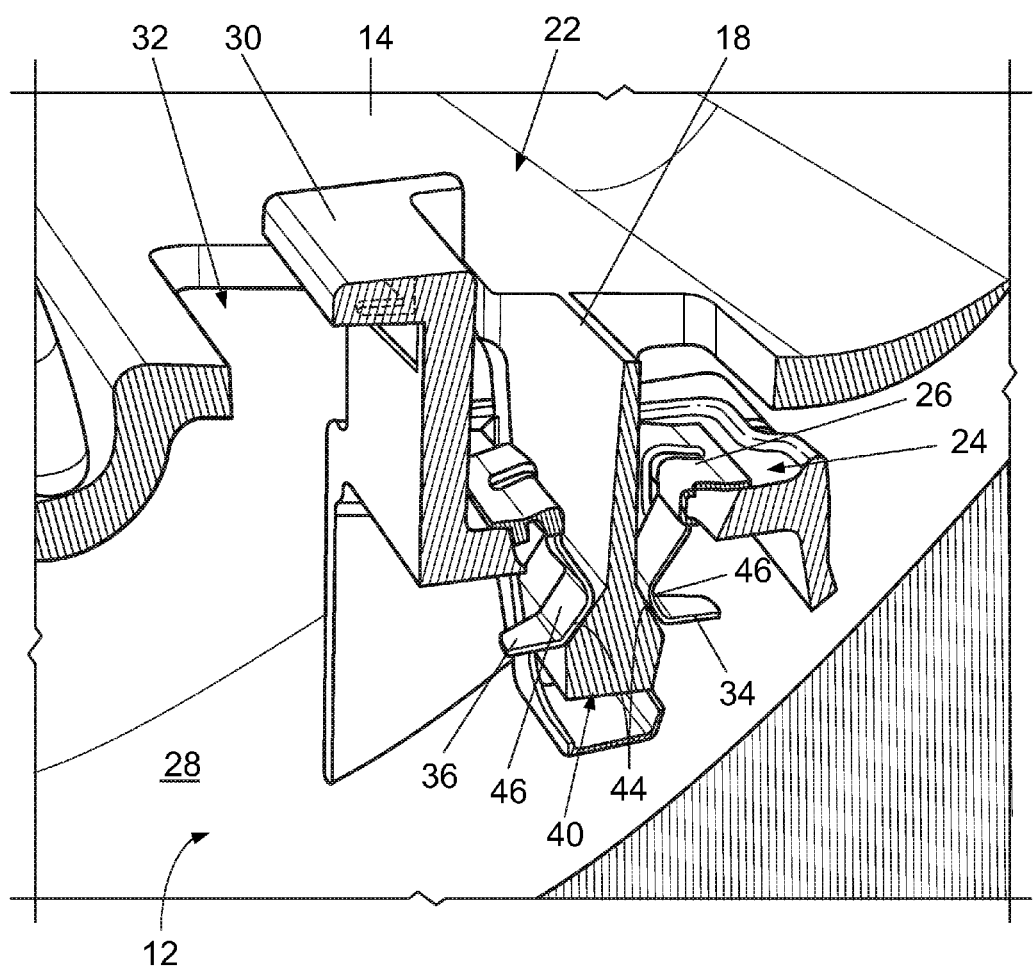
FIG. 14 shows a cross section view of a mounting tab received into an attachment socket and a release tab extending through a release tab opening in the carrier plate according to the present invention.
Figure 15:
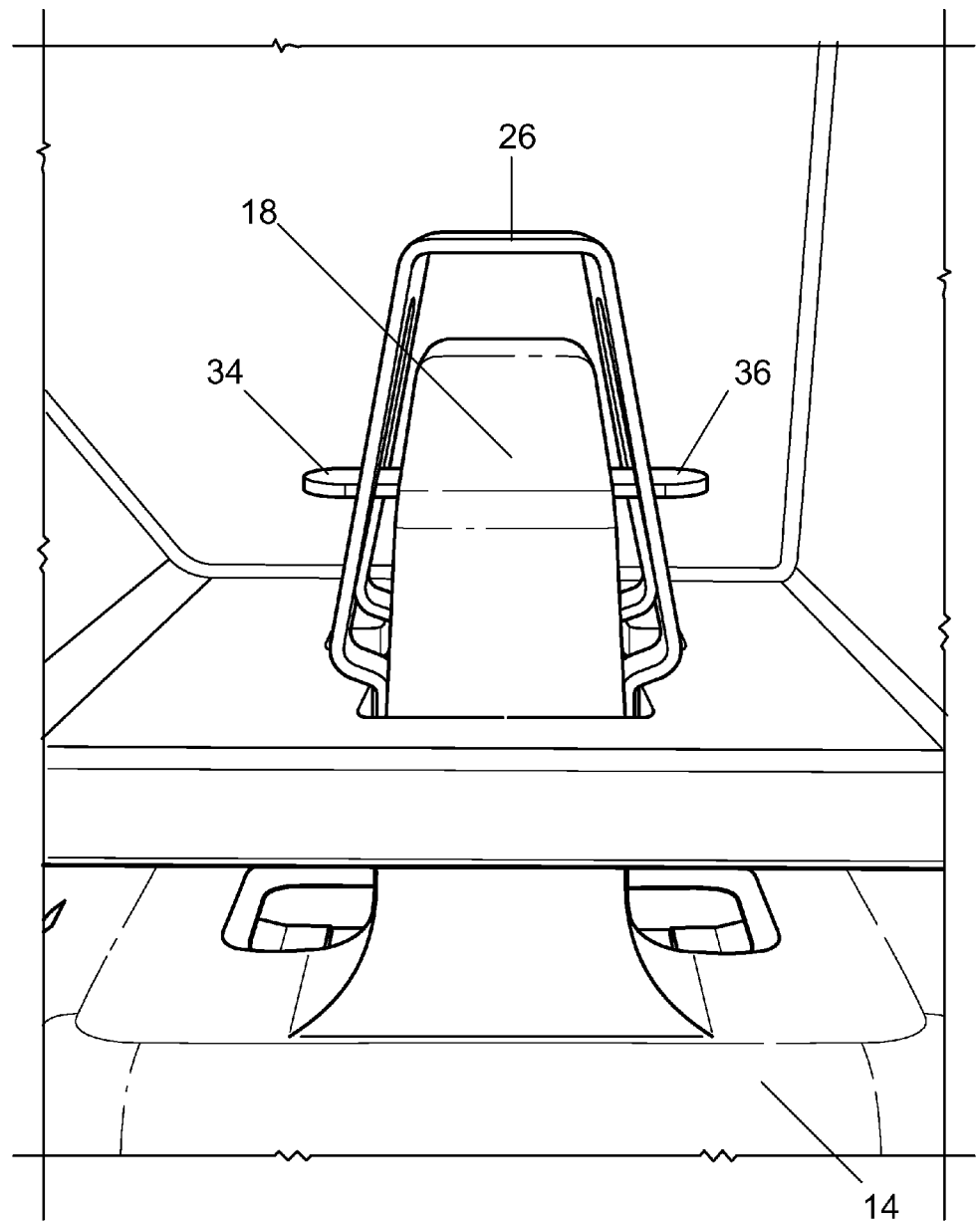
FIG. 15 shows an enlarged perspective view of a mounting tab received in an attachment socket according to the present invention.

Referring to FIGS. 5, 12 and 14, in the illustrated embodiment, mounting tabs 18 can further include a head portion, designated generally as 42, having angled engaging surfaces 44 disposed on opposite sides to help further secure mounting tabs 18 in attachment sockets 24. In this arrangement, first and second flexible retaining arms 34 and 36 having a complementary retaining surface 46 aligning flush against each of angled engaging surfaces 44 of mounting tabs 18 in a friction fit arrangement for releasably holding mounting tabs 18 in attachment sockets 24. The stronger first and second flexible retaining arms 34 and 36 are to move, the more securely cover 12 is carried on mounting tabs 18. In operation, engagement between angled engaging surfaces 44 of mounting tabs 18 and retaining surfaces 46 of first and second flexible retaining arms 34 and 36 direct the first and second flexible retaining arms 34 and 36 to extend laterally when mounting tabs 18 are being withdrawn from attachment sockets 24 to facilitate the release of cover 12 from carrier plate 14.

Referring to FIG. 4, in a further advantageous illustrated embodiment, a flange 48 can be provided extending around a top side of attachment sockets 24 for defining a clip recess 50. Spring clip 26 is then seated in clip recess 50 to resist movement of spring clip 26 in attachment socket 24.

In the illustrated embodiment, carrier plate 14 also includes bezel 16 extending completely around a perimeter of carrier plate 14. Depending on the mirror design, bezel 16 may or may not need to extend around the entire perimeter of carrier plate 14. Referring to FIGS. 6-9, as shown in the illustrated example embodiment, bezel 16 includes a bezel lip 52 extending along select portions of bezel 16. Further, referring to FIGS. 10-11, in the illustrated embodiment, a cover lip receiving slot 54 is provided extending along select portions of bezel 16 that do not include bezel lip 52. This is not to say that everywhere there is no bezel lip 52 there is a cover lip receiving slot 54, but rather, there is simply no overlap between portion of bezel 16 that carry a bezel lip 52 or a cover lip receiving slot 54. Preferably, cover lip receiving slot 54 is disposed along an interior edge portion of bezel 16.

Referring to FIG. 3, in the illustrated embodiment, cover 12 includes a cover lip 56 extending along select portions of a perimeter edge of cover 12. Further, in the illustrated example embodiment, a bezel lip receiving slot 58 is provided extending along select portions of the perimeter edge not including cover lip 56. As noted above for bezel 16, this is not to say that everywhere there is no cover lip 56 there is a bezel lip receiving slot 58, but rather, there is simply no overlap between portion of cover 12 that carry a cover lip 56 or a bezel lip receiving slot 58.

Figure 16:
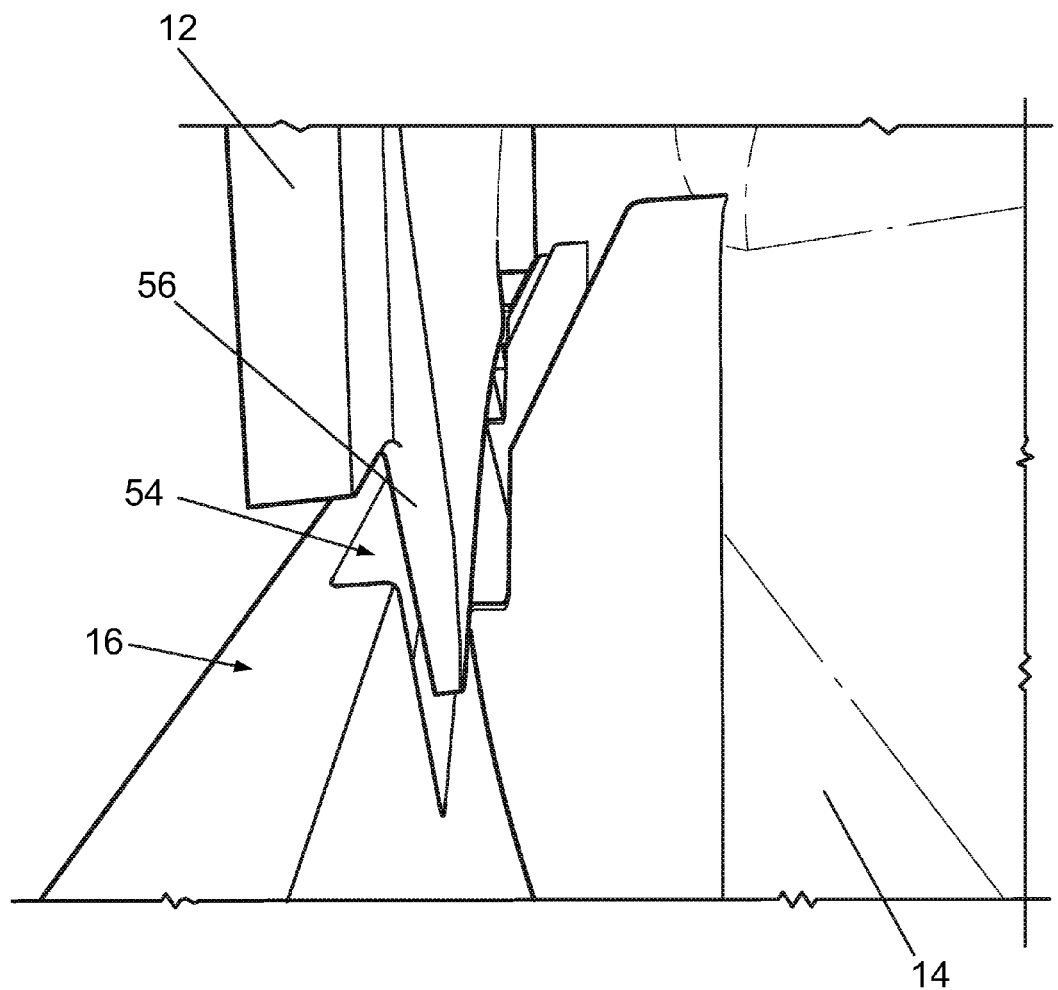
FIG. 16 shows an enlarged perspective view of a cover lip received into a cover lip receiving slot along a first bezel vertical edge according to the present invention; and, FIG. 17 shows an enlarged partial top perspective view of engagement between the cover and bezel according to the present invention.
Figure 17:
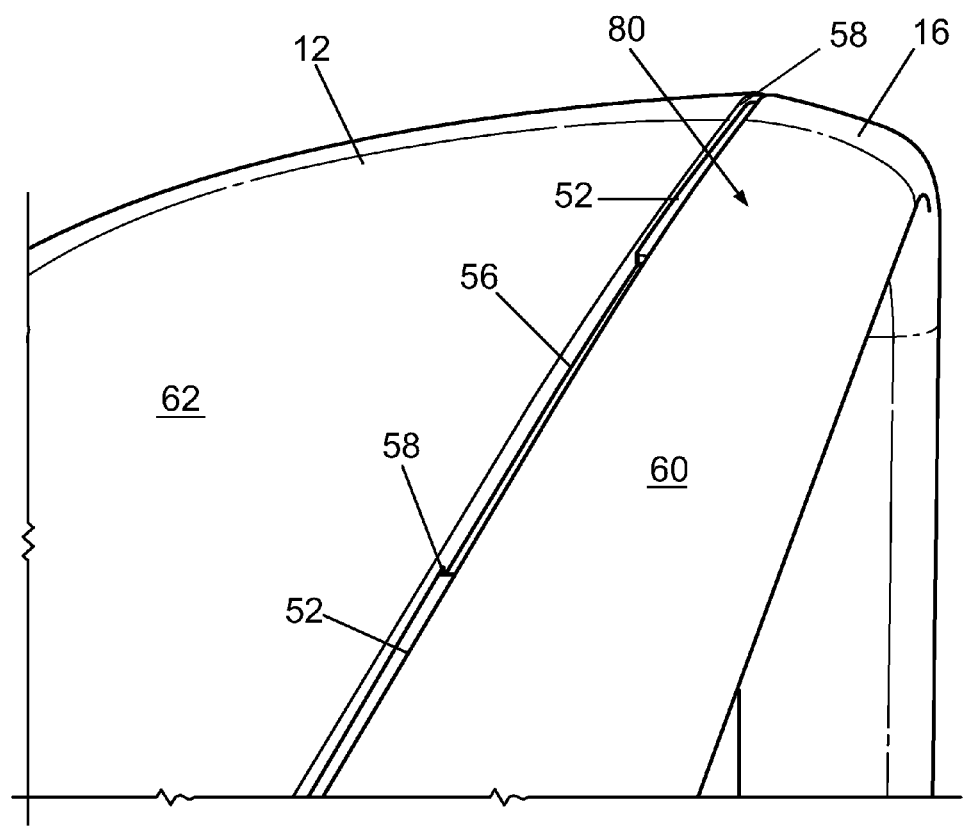

Referring to FIGS. 16 and 17, when cover 12 is mounted to carrier plate 14, cover lip 56 is received into cover lip receiving slot 54 of bezel 16 and bezel lip 52 is received into bezel lip receiving slot 58 of cover 12 to interconnect bezel 16 and cover 12 in a stable and secure arrangement. As shown in FIG. 17, in the illustrated embodiment, cover 12 is accordingly aligned and maintained in connection with bezel 16 so that an exterior surface 60 of bezel 16 is aligned generally flush with an exterior surface 62 of cover 12 when mounted to carrier plate 14. By intermittently extending the respective lips and receiving slots noted above around bezel 16 and cover 12, the components are better able to interconnect when mounted together and provide a more stable and sturdy assembly to resistant the damaging effects of road vibrations.

Figure 7:
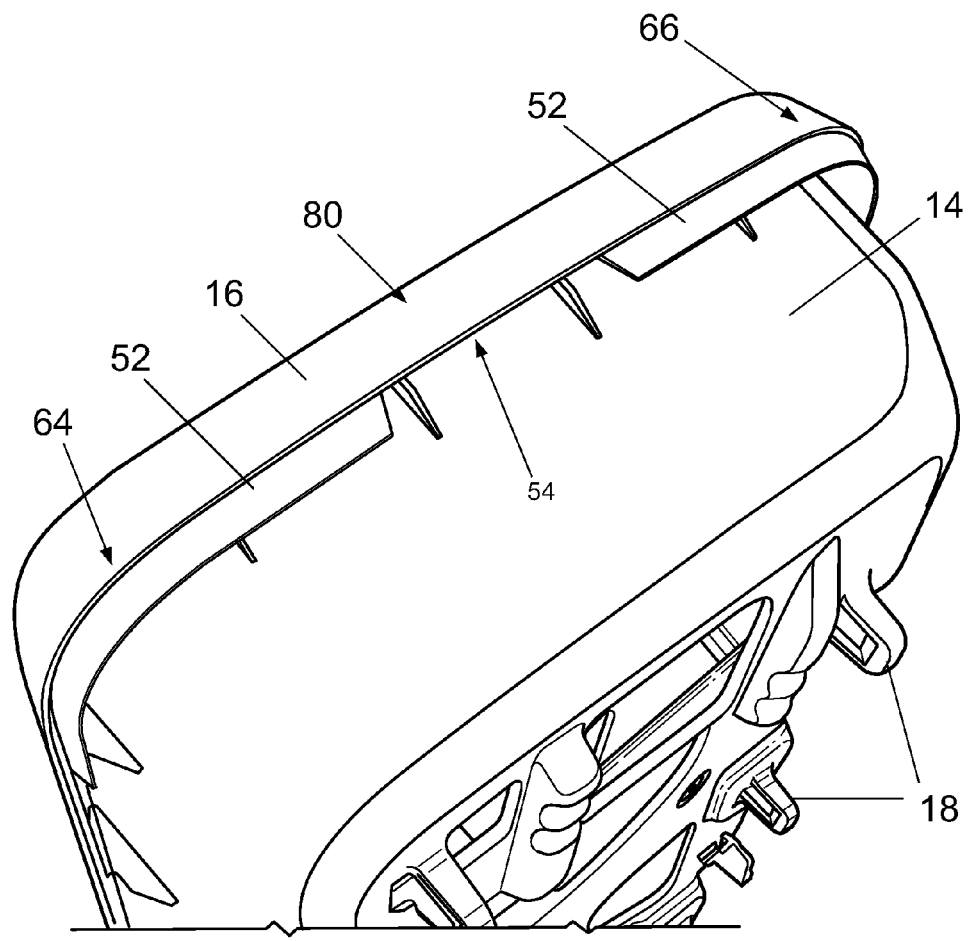
FIG. 7 shows an enlarged partial top perspective view of the carrier plate according to the present invention.
Figure 8:
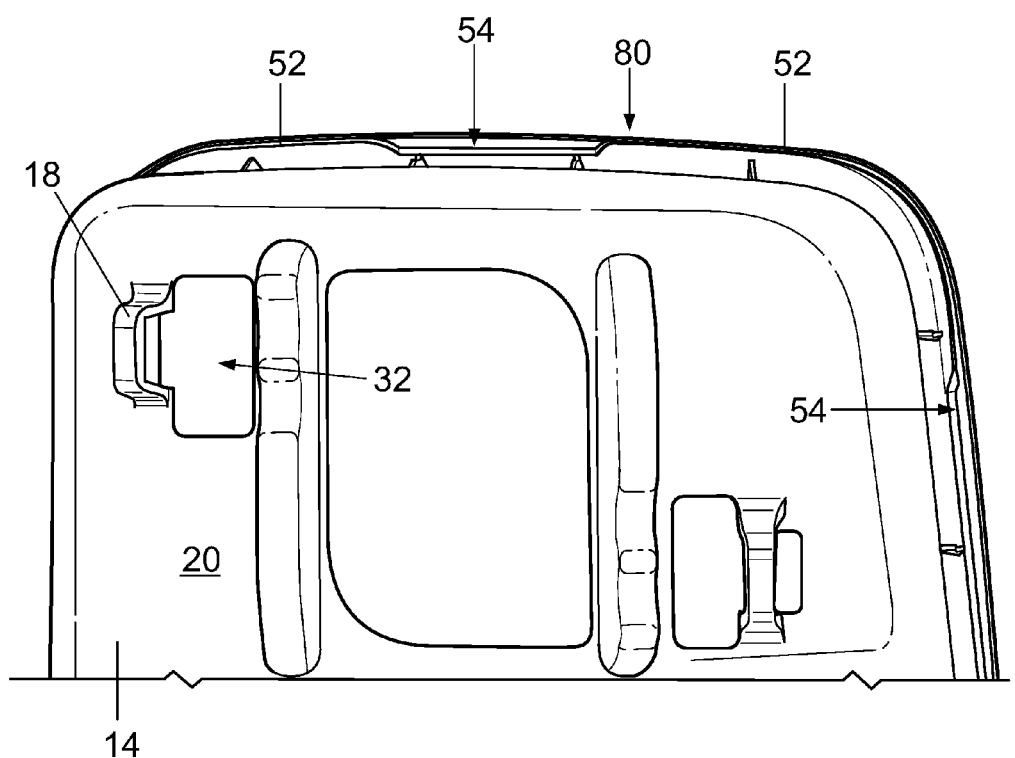
FIG. 8 shows an enlarged partial side view of the carrier plate according to the present invention.
Figure 9:
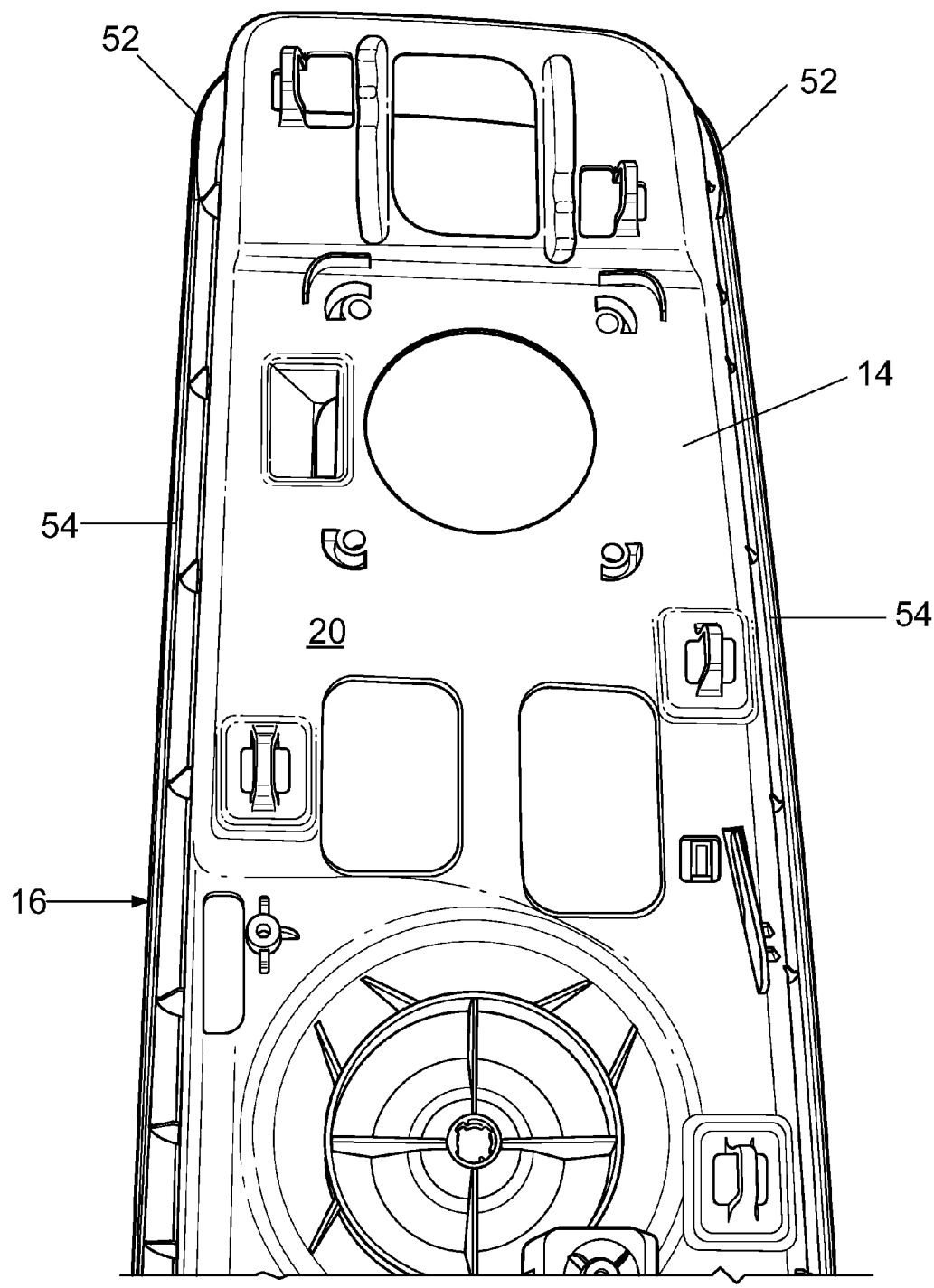
FIG. 9 shows a rear perspective view of the carrier plate according to the present invention.
Figure 10:
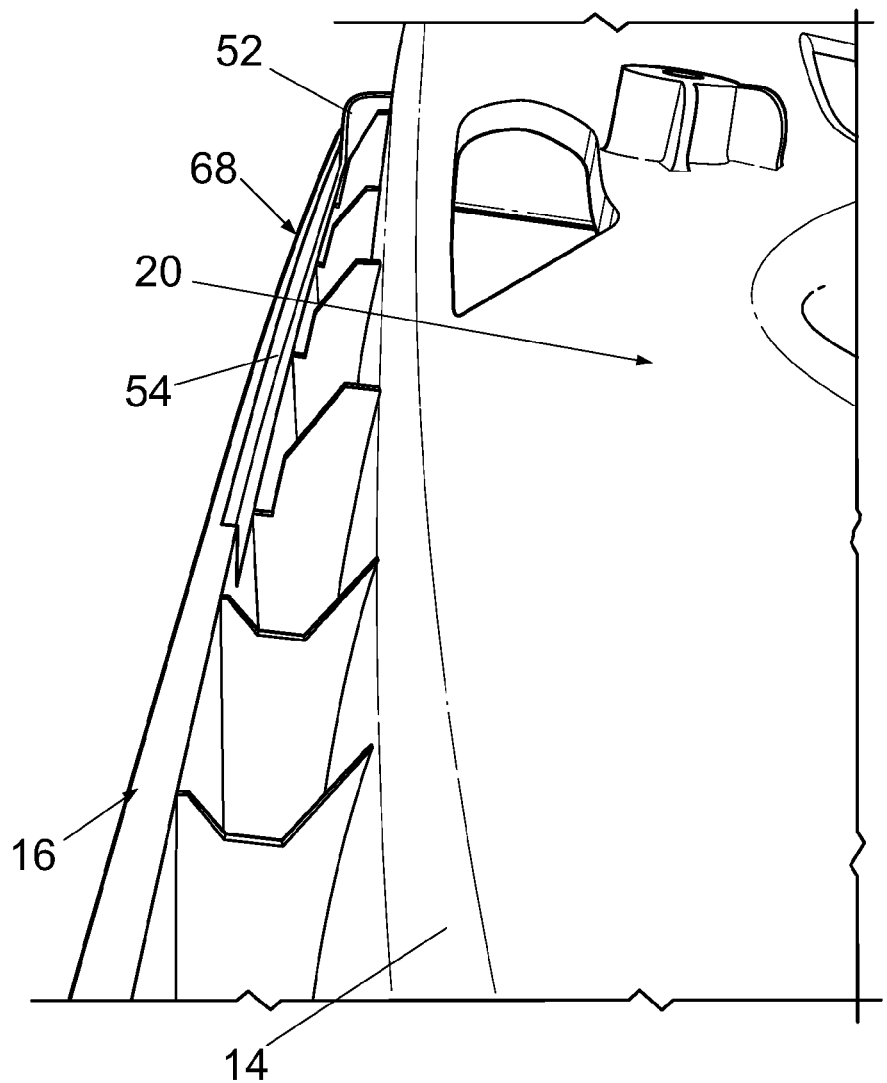
FIG. 10 shows an enlarged perspective view of a cover lip receiving slot disposed a first bezel vertical edge according to the present invention.
Figure 11:
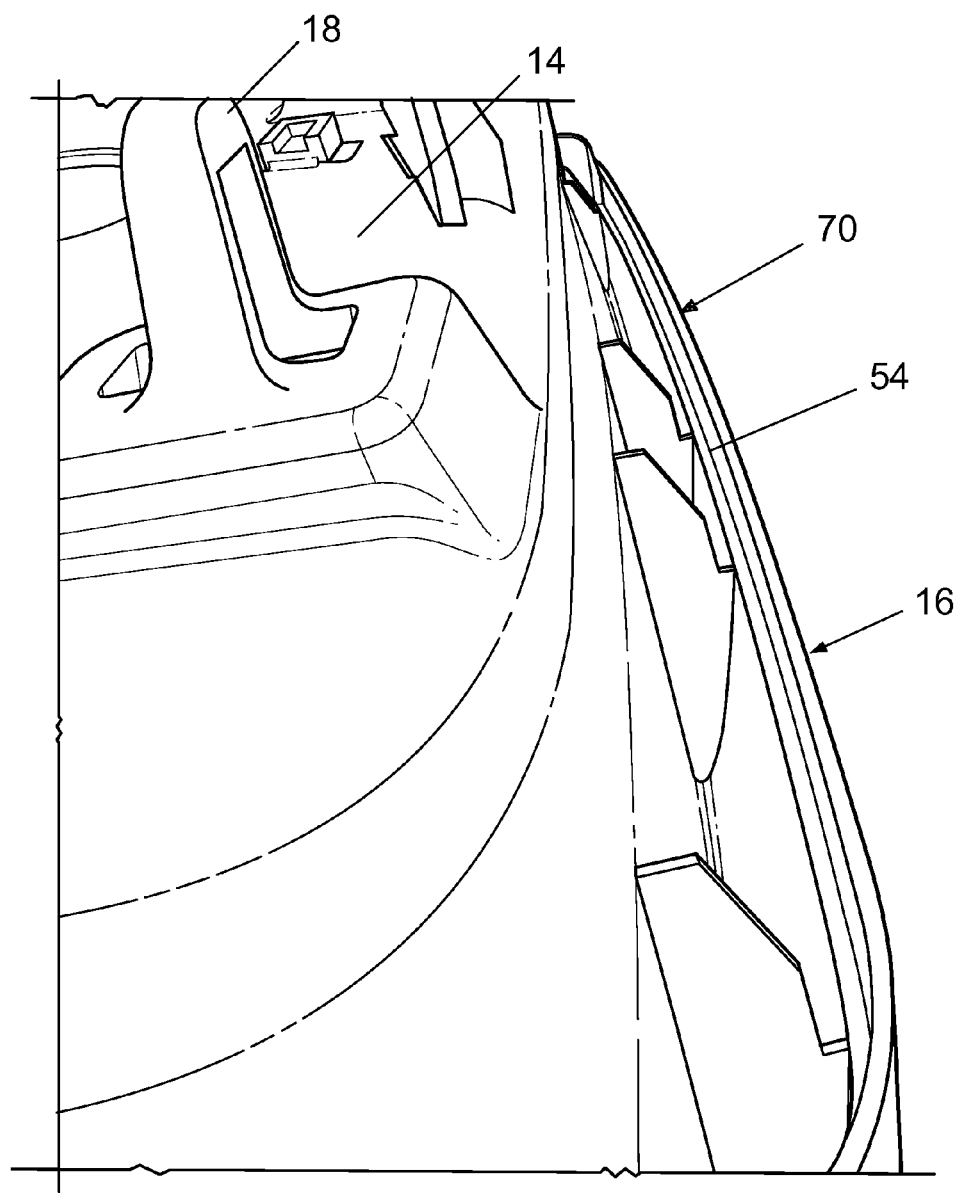
FIG. 11 shows an enlarged perspective view of a cover lip receiving slot on a second bezel vertical edge according to the present invention.

Referring to FIG. 7, in the illustrated example embodiment, bezel lip is specifically disposed along a first bezel corner portion 64 and a second bezel corner portion 66. Referring to FIGS. 10 and 11, a cover lip receiving slot 54 is disposed along a first bezel vertical edge 68 (FIG. 10) and a second bezel vertical edge 70 (FIG. 11). Further, referring to FIG. 3, a cover lip 56 is disposed along a first cover vertical edge 72 and a second cover vertical edge 74. Also, a bezel lip receiving slot 58 is disposed along a first cover corner portion 76 and a second cover corner portion 78.

Referring to FIGS. 3, 7, 8 and 17, in the illustrated embodiment, cover lip receiving slot 54 extends along a top bezel edge 80, and cover lip 56 extends along a top cover edge 82, wherein cover lip 56 of top cover edge 82 is received into cover lip receiving slot 54 on top bezel edge 80 for interconnecting cover 12 to bezel 16.

While a preferred embodiment of the invention has been described using specific terms, such description is for illustrative purposes only, and it is to be understood that changes and variations may be made without departing from the spirit or scope of the following claims.

What is claimed is:

1. An attachment system for an exterior cover of a vehicle mirror assembly, said attachment system comprising:
   a carrier plate for supporting mirror assembly components;
   a plurality of mounting tabs projecting outward from a first side of said carrier plate;
   an exterior cover mounted to said carrier plate to generally enclose said first side of said carrier plate;
   a complementary arrangement of attachment sockets carried by said cover receiving said mounting tabs; and,
   a spring clip carried in each of said attachment sockets engaging said mounting tabs in a releasably connected engagement;
   whereby said cover is securely and releasably mounted to said carrier plate.

2. The attachment system of claim 1 including a release tab disposed generally adjacent at least one of said attachment sockets extending through a complementary release tab opening disposed in said carrier plate generally adjacent one of said mounting tabs, whereby directing said release tab back through said release tab opening causes said attachment socket to disengage from said mounting tab for removing said cover from said carrier plate.

3. The attachment system of claim 1 wherein each said spring clip includes a first flexible retaining arm carried on a first side in each of said attachment sockets, and a second flexible retaining arm carried on a second side in each of said attachment sockets disposed opposite said first side, wherein said first and second flexible retaining arms engage opposing sides of said mounting tabs for holding said mounting tabs in said attachment sockets.

4. The attachment system of claim 3 wherein said mounting tabs include a head portion having angled engaging surfaces disposed on opposite sides, and said first and second flexible retaining arms having a complementary retaining surface aligning flush against each of said angled engaging surfaces of said mounting tabs in a friction fit arrangement releasably holding said mounting tabs in said attachment sockets.

5. The attachment system of claim 4 wherein said engagement between said angled engaging surfaces of said mounting tabs and said retaining surfaces of said first and second flexible retaining arms direct said first and second flexible retaining arms to extend laterally when said mounting tabs are withdrawn from said attachment sockets.

6. The attachment system of claim 1 including a flange disposed around said attachment socket defining a clip recess, wherein said spring clip is seated in said clip recess to resist movement of said spring clip in said attachment socket.

7. The attachment system of claim 1 wherein said carrier plate includes a bezel extending around a perimeter of said carrier plate.

8. The attachment system of claim 7 wherein said bezel includes a bezel lip extending along select portions of said bezel, and a cover lip receiving slot extending along select portions of said bezel not including said bezel lip.

9. The attachment system of claim 8 wherein said cover includes a cover lip extending along select portions of a perimeter edge of said cover, and a bezel lip receiving slot extending along select portions of said perimeter edge portion not including said cover lip.

10. The attachment system of claim 9 wherein said cover lip is received into said cover lip receiving slot of said bezel and said bezel lip is received into said bezel lip receiving slot of said cover so that an exterior surface of said bezel is aligned generally flush with an exterior surface of said cover when mounted to said carrier plate.

11. An attachment system for an exterior cover of a vehicle mirror assembly, said attachment system comprising:
   a carrier plate having a plurality of mounting tabs;
   an exterior cover having a plurality of attachment sockets releasably engaging said mounting tabs;
   a bezel extending around a perimeter of said carrier plate including a bezel lip extending along select portions of said bezel, and a cover lip receiving slot extending along select portions of said bezel not including said bezel lip;
   a cover lip included on said cover extending along select portion of a perimeter edge of said cover, and a bezel lip receiving slot extending along select portions of said perimeter edge not including said cover lip;
   wherein said cover lip is received into said cover lip receiving slot of said bezel and said bezel lip is received into said bezel lip receiving slot of said cover so that an exterior surface of said bezel is aligned generally flush with an exterior surface of said cover when mounted to said carrier plate; and,
   whereby said cover is securely and releasably mounted to said carrier plate.

12. The attachment system of claim 11 including a spring clip carried in each of said attachment sockets engaging said mounting tabs in a releasably connected engagement.

13. The attachment system of claim 12 including a flange disposed around said attachment socket defining a clip recess, wherein said spring clip is seated in said clip recess to resist movement of said spring clip in said attachment socket.

14. The attachment system of claim 12 wherein each said spring clip includes at least one flexible retaining arm carried engaging said mounting tabs for holding said mounting tabs in said attachment sockets.

15. The attachment system of claim 14 wherein said mounting tabs include a head portion having at least one angled engaging surface, and said at least one flexible retaining arm having a complementary retaining surface aligning flush against said angled engaging surface of said mounting tabs in a friction fit arrangement releasably holding said mounting tabs in said attachment sockets.

16. An attachment system for an exterior cover of a vehicle mirror assembly, said attachment system comprising:
   a carrier plate having a plurality of mounting tabs disposed on a first side of said carrier plate and a bezel disposed around a perimeter;
   a cover having a plurality of attachment sockets disposed on an interior side for engaging said mounting tabs;
   a spring clip carried in each of said attachment sockets engaging said mounting tabs so that said cover is securely and releasably mounted to said carrier plate;
   a bezel lip disposed along a first bezel corner portion and a second bezel corner portion;
   a cover lip receiving slot disposed along a first bezel vertical edge and a second bezel vertical edge;
   a cover lip disposed along a first cover vertical edge and a second cover vertical edge;
   a bezel lip receiving slot disposed along a first cover corner portion and a second cover corner portion;
   wherein said cover lip is received into said cover lip receiving slot of said bezel and said bezel lip is received into said bezel lip receiving slot of said cover so that an exterior surface of said bezel is aligned generally flush with an exterior surface of said cover when mounted to said carrier plate.

17. The attachment system of claim 16 wherein said cover lip receiving slot extends along a top bezel edge, and said cover lip extends along a top cover edge, wherein said cover lip of said top cover edge is received into said cover lip receiving slot on said top bezel edge for interconnecting said cover to said bezel.

18. The attachment system of claim 16 including a flange disposed around said attachment socket defining a clip recess, wherein said spring clip is seated in said clip recess to resist movement of said spring clip in said attachment socket.

19. The attachment system of claim 16 including at least one release tab carried on said interior side of said cover extending through a complementary release tab opening disposed in said carrier plate, whereby directing said release tab back through said release tab opening causes said attachment sockets to disengage from said mounting tabs for removing said cover from said carrier plate.

20. The attachment system of claim 16 wherein said mounting tabs include a head portion having at least one angled engaging surface, and said spring clips include at least one flexible retaining arm having a complementary retaining surface aligning flush against said angled engaging surface of said mounting tabs in a friction fit arrangement releasably holding said mounting tabs in said attachment sockets.

* * * * *